United States Patent

[11] 3,624,690

| [72] | Inventor | James G. Ashley<br>P.O. Box 1 Middleboro Road, East Freetown, Mass. 02717 |
|---|---|---|
| [21] | Appl. No. | 873,926 |
| [22] | Filed | Nov. 4, 1969 |
| [45] | Patented | Nov. 30, 1971 |

[54] FISHHOOK WITH RETRACTABLE BARB
1 Claim, 6 Drawing Figs.

[52] U.S. Cl............................................. 43/43.16, 43/53.5
[51] Int. Cl.............................................. A01k 83/00
[50] Field of Search.................................. 43/43.16, 43.2, 43.4, 44.2, 44.8, 53.5, 17.2, 4, 35, 37

[56] References Cited
UNITED STATES PATENTS

| 1,152,698 | 9/1915 | Bonner | 43/44.8 |
| 2,217,928 | 10/1940 | Ward | 43/43.16 |

*Primary Examiner*—Warner H. Camp

ABSTRACT: A sleeve member in the form of a fishhook is slotted adjacent each of its closed ends. A spring wire member is slidably received in the sleeve and has one end formed to provide a barb retractable into the sleeve through one slotted end. The other end of the wire is looped and extends through the other slotted end of the sleeve.

PATENTED NOV 30 1971    3,624,690
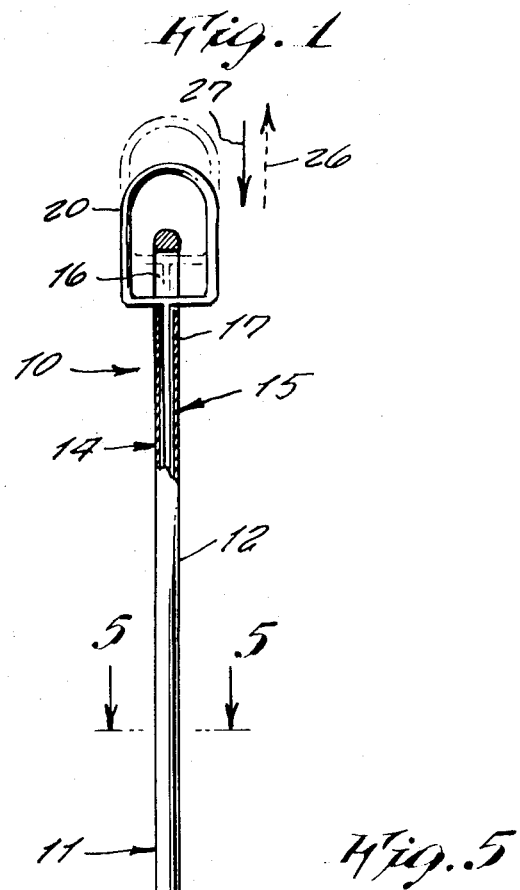
Fig. 1
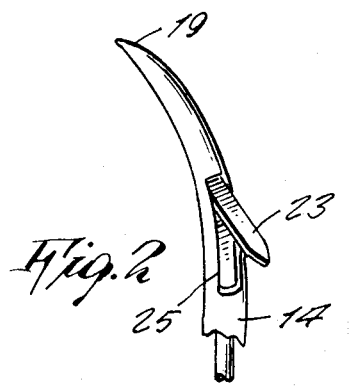
Fig. 2
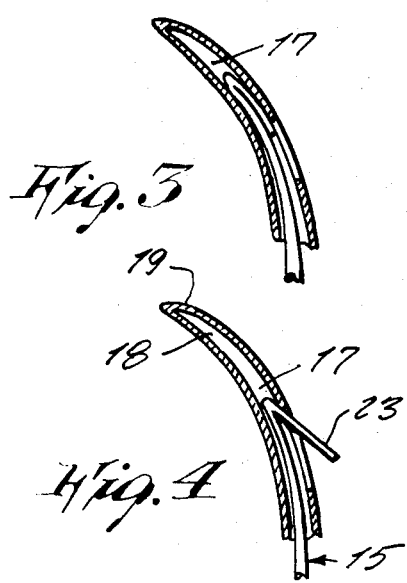
Fig. 3
Fig. 4
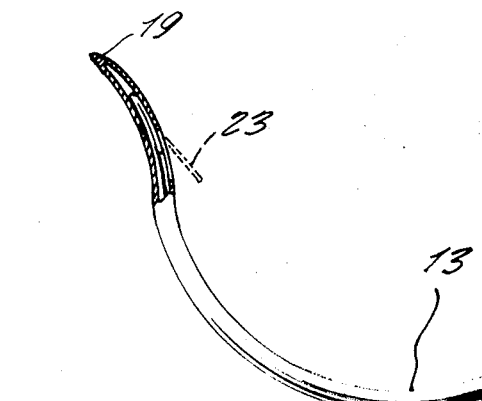
Fig. 5
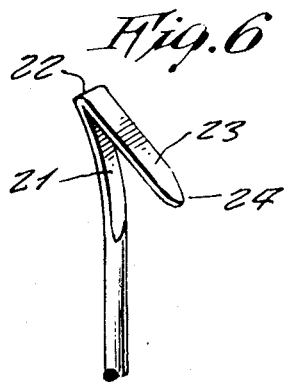
Fig. 6
INVENTOR
JAMES G. ASHLEY

FISHHOOK WITH RETRACTABLE BARB

This invention relates generally to fishhooks such as are used by fishermen to catch fish.

A principal object of the present invention is to provide an improved fishhook having self-contained means for quickly and easily disengaging a caught fish from a fishhook after the fish has been landed, thereby preventing excessive maneuvering in trying to free the fish from the hook and which sometimes can be a dangerous operation particularly when the fish has a spiny fin such as a codfish.

Another object of the present invention is to provide a fishhook which is particularly suitable to a fisherman who likes to catch fish only for the sport thereof and who prefers to return the fish back to the water after it has been caught and wherein accordingly it is desirable that the fish is not greatly damaged during the process of trying to remove the hook from the fish's mouth. Heretofore it is known that the barb of the hook causes considerable damage to the fish while trying to rip the hook out of the fish's mouth.

Yet another object is to provide a fishhook from which a fish can be quickly and easily detached.

Other objects of the present invention are to provide a fishhook which is simple in design, inexpensive to manufacture, rugged in construction, easy to use and efficient in operation.

These and other objects will become readily evident upon a study of the following specification and the accompanying drawing wherein:

FIG. 1 is a side elevation view of a fishhook incorporating the present invention, shown partly in cross section, FIG. 2 is an enlarged perspective view of the fishhook end with the barb shown in extended position, FIG. 3 is an enlarged cross-sectional view of the fishhook end with the barb in a retracted position, FIG. 4 is a view generally similar to FIG. 3 and showing the barb in an extended position, FIG. 5 is a cross-sectional view taken on the line 5—5 of FIG. 1, and FIG. 6 is a fragmentary perspective view of a member which incorporates the barb at one end thereof.

Referring now to the drawing in detail, the reference numeral 10 represents a fishhook according to the present invention wherein there is a fishhook 11 of generally conventional configuration and which includes a shank 12 of generally straight configuration, the shank having at one end thereof a generally semicircular hook 13, the terminal end of the hook being adaptable for engaging with the mouth of a fish.

In the present invention, the fishhook includes a fishhook-configured sleeve 14 and within the sleeve there is a slidable wire 15.

The sleeve 14 includes a straight shank 12 which at one end thereof there is provided a transverse-extending slot 16 which communicates with a central opening 17. The opening 17 extends around the generally semicircular hook portion 13 of the sleeve, the terminal end of the opening 17 terminating in a dead end 18 formed in the tapered terminal end 19.

The wire member 15 is integral with a loop 20 at one end thereof, the loop 20 being fitted within the slot 16 of the sleeve member so that the loop 20 may slide between the position as indicated by the solid lines and the dotted lines of FIG. 1 of the drawing. The wire 15 extends through the opening 17 extending through the shank and into the hook-configurated portion of the sleeve, and the terminal end of the wire is configured as shown in FIG. 6 wherein the terminal end of the wire is flattened as shown at 21 and the terminal end is then bent over around a bend 22 so as to form a spur or barb 23. The terminal end of the barb 23 may be pointed as shown at 24. It is to be noted that the wire member 15 is preferably of spring steel material so that in a relaxed position, the barb 23 will pivot away from the flattened portion 21 as shown in FIG. 6. Thus in a normally operative use, the barb 23 will extend as indicated by the phantom lines in FIG. 1 of the drawing.

As shown in greater clarity in FIG. 2 of the drawing, the sleeve 14 is provided with a slot 25 with a pointed or tapered end 19, the slot 25 providing a means for the barb 23 to slide outwardly of the opening 17 and into an operative use so as to secure a fish on the fishhook.

In an operative use, a fishing line leader may be attached to the loop 20 so as to pull upon the wire member 15. When thus pulling on the loop 20, the wire member is pulled upwardly so that the loop assumes the position as shown by the phantom lines in FIG. 1. Such upwardly pulled direction is indicated by the arrow 26. When the loop is thus pulled upwardly, the opposite end of the wire 15 will cause the barb 23 to be brought into position with the slot 25 so that the barb will project outwardly of the slot and assume the service of a spur for securing a fish caught on the hook. After the fish has been landed, and it is desired to disengage the fish from the fishhook, the fisherman needs only to move the loop in the direction as indicated by the solid line of arrow 27 thus causing the wire member 15 to be pushed downwardly into the opening 17 of the sleeve member 14 and causing the opposite end to be pushed upwardly toward the terminal end of the opening dead end 18, thus causing the barb 23 to be pulled inwardly so to assume the position as shown in FIG. 3. The barb thus retracted will permit the fisherman to easily withdraw the hook from the fishmouth without any obstruction from the barb.

Thus there has been provided a fishhook which allows quick and easy disengagement of a fish from the fishhook so that the fish can be either returned to the water with a minimum amount of harm thereto or wherein the fish may be easily removed from the hook with minimum of struggle and effort and which in the case with fish with spiny fins can be dangerous to a fisherman.

What I now claim is:

1. The combination of a fishhook assembly, said fishhook assembly being comprised of a sleeve member and a central wire slidable within said sleeve member, said wire member incorporating a barb element, and said sleeve member comprising means for exposing said barb element for operative use and retracting said barb element within said sleeve member for an inoperative use, said sleeve member comprising a tube including a straight shank portion, one end of said straight shank portion being joined to one end of a generally semicircular portion and the opposite end of said generally semicircular portion terminating in a tapered point, a central opening of said sleeve terminating within a blind end within said tapered point of said generally semicircular hook portion, and the opposite end of said straight shank portion being provided with a transverse-extending slot communicating with said central opening of said sleeve, said wire member comprising a spring steel wire having a loop integral therewith at one end thereof, said loop being fitted through said slot of said sleeve member, and the opposite end of said wire member being flattened with a transverse end across an intermediate portion thereof so to form a terminal barb which normally spreads away from a remaining flattened portion on said end of said wire member, said sleeve member being provided with a slot near said tapered point of said hook portion, said barb being slidable inwardly and outwardly of said slot upon longitudinal movement of said wire member within said sleeve, so that when said wire is pulled on said loop, said barb is outwardly positioned relatively close to said tapered point.

* * * * *